US010181890B2

(12) United States Patent
Su

(10) Patent No.: US 10,181,890 B2
(45) Date of Patent: Jan. 15, 2019

(54) CHANNEL STATE INFORMATION ACQUISITION METHOD, CHANNEL STATE INFORMATION FEEDBACK METHOD AND DEVICES THEREOF

(71) Applicant: CHINA ACADEMY OF TELECOMMUNICATIONS TECHNOLOGY, Beijing (CN)

(72) Inventor: Xin Su, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/551,275

(22) PCT Filed: Jan. 14, 2016

(86) PCT No.: PCT/CN2016/070907
§ 371 (c)(1),
(2) Date: Aug. 15, 2017

(87) PCT Pub. No.: WO2016/141778
PCT Pub. Date: Sep. 15, 2016

(65) Prior Publication Data
US 2018/0041265 A1 Feb. 8, 2018

(30) Foreign Application Priority Data

Mar. 6, 2015 (CN) .......................... 2015 1 0101468
Jun. 16, 2015 (CN) .......................... 2015 1 0333877

(51) Int. Cl.
H04B 7/06 (2006.01)
H04B 17/336 (2015.01)
(Continued)

(52) U.S. Cl.
CPC ......... *H04B 7/0634* (2013.01); *H04B 7/0456* (2013.01); *H04B 7/0469* (2013.01);
(Continued)

(58) Field of Classification Search
CPC .. H04B 7/0634; H04B 7/0658; H04B 7/0478; H04B 7/0469; H04B 7/0456;
(Continued)

(56) References Cited

U.S. PATENT DOCUMENTS 8,976,884 B2 * 3/2015 Krishnamurthy .... H04B 7/0413
375/267
2012/0127878 A1 5/2012 Kim et al.
(Continued)

FOREIGN PATENT DOCUMENTS

CN 1946001 A 4/2007
CN 101820335 A 9/2010
(Continued)

OTHER PUBLICATIONS

International Preliminary Report on Patentability (IPRP; Ch. 1) for PCT/CN2016/070907, dated Sep. 21, 2017, and its English translation provided by WIPO.

(Continued)

Primary Examiner — Jay P Patel
(74) Attorney, Agent, or Firm — Ladas & Parry, LLP

(57) ABSTRACT

A CSI feedback method includes steps of: performing, by a terminal, channel estimation on a received pilot signal to acquire channel estimation values of A antenna ports for transmitting the pilot signal to a network device; determining, by the terminal, Q antenna ports based on the channel estimation values of the A antenna ports, L≤Q≤A, L representing a value of a RI adopted by the network device in the case of transmitting downlink data to the terminal or a value of a RI of a channel determined by the terminal; and (Continued)

determining, by the terminal, a first-level PMI based on the Q antenna ports, and feeding back CSI containing the first-level PMI to the network device, the first-level PMI being used to indicate indices of the Q antenna ports among the A antenna ports for transmitting the pilot signal.

20 Claims, 6 Drawing Sheets

(51) Int. Cl.
 *H04B 7/0456* (2017.01)
 *H04L 5/00* (2006.01)
 *H04W 24/10* (2009.01)
(52) U.S. Cl.
 CPC ......... *H04B 7/0478* (2013.01); *H04B 7/0626* (2013.01); *H04B 7/0632* (2013.01); *H04B 7/0658* (2013.01); *H04B 17/336* (2015.01); *H04L 5/0057* (2013.01); *H04W 24/10* (2013.01)
(58) Field of Classification Search
 CPC .. H04B 17/336; H04B 7/0632; H04B 7/0626; H04L 5/0057; H04W 24/10
 See application file for complete search history.

(56) References Cited

U.S. PATENT DOCUMENTS

| | | | | |
|---|---|---|---|---|
| 2013/0114425 | A1* | 5/2013 | Sayana | H04B 7/024 370/252 |
| 2013/0344909 | A1* | 12/2013 | Davydov | H04B 7/0689 455/501 |
| 2014/0098689 | A1* | 4/2014 | Lee | H04B 7/0469 370/252 |
| 2014/0177683 | A1* | 6/2014 | Krishnamurthy | H04B 7/0469 375/219 |
| 2014/0177744 | A1* | 6/2014 | Krishnamurthy | H04B 7/0469 375/267 |
| 2015/0092875 | A1* | 4/2015 | Kim | H04B 7/0478 375/267 |
| 2016/0050006 | A1 | 2/2016 | Ko et al. | |
| 2016/0165457 | A1 | 6/2016 | Inoue et al. | |
| 2016/0211903 | A1* | 7/2016 | Damnjanovic | H04B 7/0626 |

FOREIGN PATENT DOCUMENTS

| | | |
|---|---|---|
| CN | 102025455 A | 4/2011 |
| CN | 102271026 A | 12/2011 |
| CN | 103229428 A | 7/2013 |
| EP | 2822203 A1 | 1/2015 |
| GB | 2492564 A | 1/2013 |
| WO | 2012/144866 A2 | 10/2012 |
| WO | 2014/171658 A1 | 10/2014 |
| WO | 2014/208974 A1 | 12/2014 |
| WO | 2015/019775 A1 | 2/2015 |

OTHER PUBLICATIONS

Written Opinion of the International Search Authority for PCT/CN2016/070907, dated Apr. 11, 2016, and its English translation provided by WIPO.
From EP Application No. 16761005.4, European Search Report and Search Opinion dated Feb. 20, 2018.
3GPP TS 36.213 V12.4.0; "3$^{rd}$ Generation Partnership Project; Technical Specification Group Radio Access Network; Evolved Universal Terrestrial Radio Access (E-UTRA); Physical layer procedures (Release 12)." France; Retrieved from the Internet on Jan. 7, 2015: <http://www.3gpp.org/ftp/Specs/2014-12/Rel-12/36 series/>; pp. 74-112.
International Search Report for PCT /CN2016/070907, dated Apr. 11, 2016, and its English translation provided by WIPO.
Written Opinion of the International Search Authority for PCT /CN2016/070907, dated Apr. 11, 2016, and its English translation provided by Goole Translate.

* cited by examiner

CHANNEL STATE INFORMATION ACQUISITION METHOD, CHANNEL STATE INFORMATION FEEDBACK METHOD AND DEVICES THEREOF

CROSS-REFERENCE TO RELATED APPLICATIONS

The present application is the U.S. national phase of PCT Application No. PCT/CN2016/070907 filed on Jan. 14, 2016, which claims priorities to the Chinese patent application No. 201510101468.4 filed on Mar. 6, 2015 and the Chinese patent application No. 201510333877.7 filed on Jun. 16, 2015, the disclosures of which are incorporated herein by reference in their entireties.

TECHNICAL FIELD

The present disclosure relates to the field of communication technology, in particular to a channel state information (CSI) acquisition method, a CSI feedback method and devices thereof.

BACKGROUND

In a conventional Frequency Division Duplexing (FDD)-based Multi-Input Multi-Output (MIMO) antenna system, there are relatively few antennae for a network device, and the measurement of a complete MIMO channel matrix is not an issue for a terminal. Usually, one antenna port is configured to each antenna so as to transmit a pilot signal for measuring CSI.

In a Long Term Evolution (LTE)-Advanced system, the pilot signal for measuring the CSI is called as a reference signal, including a Cell Reference Signal (CRS) and a CSI Reference Signal (CSI-RS). The terminal determines an optimal Rank indicator (RI), an optimal Precoding Matrix Indicator (PMI) and a Channel Quality Indicator (CQI) based on the measured CSI, and reports them to the network device through a feedback channel.

For a massive MIMO technique, a large antenna array, usually including hundreds or thousands of antennae, is deployed for the network device, so as to effectively improve a spatial resolution as well as a system capacity. When the antennae are arranged as a two-dimensional (2D) Uniform Rectangular Array (URA), it is able to achieve a very high three-dimensional (3D) spatial resolution (both in a horizontal direction and a veridical direction).

However, there is no scheme for the massive MIMO system to feed back and acquire the CSI.

SUMMARY

An object of the present disclosure is to provide a CSI acquisition method, a CSI feedback method and devices thereof, so as to feed back and acquire the CSI.

In one aspect, the present disclosure provides in some embodiments a CSI feedback method, including steps of: performing, by a terminal, channel estimation on a received pilot signal to acquire channel estimation values of A antenna ports for transmitting the pilot signal to a network device; determining, by the terminal, Q antenna ports based on the channel estimation values of the A antenna ports, $L \le Q \le A$, L representing a value of a RI adopted by the network device in the case of transmitting downlink data to the terminal or a value of a RI of a channel determined by the terminal; and determining, by the terminal, a first-level PMI based on the Q antenna ports, and feeding back CSI containing the first-level PMI to the network device, the first-level PMI being used to indicate indices of the Q antenna ports among the A antenna ports for transmitting the pilot signal.

In another aspect, the present disclosure provides in some embodiments a terminal, including: a channel estimation unit configured to perform channel estimation on a received pilot signal to acquire channel estimation values of A antenna ports for transmitting the pilot signal to a network device; a determination unit configured to determine Q antenna ports based on the channel estimation values of the A antenna ports, $L \le Q \le A$, L representing a value of an RI adopted by the network device in the case of transmitting downlink data to the terminal or a value of a RI of a channel determined by the terminal; and a transmission unit configured to determine a first-level PMI based on the Q antenna ports, and feed back CSI containing the first-level PMI to the network device, the first-level PMI being used to indicate indices of the Q antenna ports among the A antenna ports for transmitting the pilot signal.

According to the CSI feedback method and the terminal in the embodiments of the present disclosure, the terminal may perform the channel estimation on the received pilot signal, and determine, from the A antenna ports for the network device, the Q antenna ports for measuring the CSI based on an estimated equivalent channel, so as to acquire the CSI. During the application, the measurement of an MIMO channel matrix may be replaced by the determination of the Q antenna ports from the A antenna ports, i.e., the measurement of signals from all pilot antenna ports for the network device and the selection of the antenna ports. As a result, it is able to determine the CSI of the terminal.

In yet another aspect, the present disclosure provides in some embodiments a CSI acquisition method, including steps of: receiving, by a network device, CSI from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, $L \le Q \le A$, L representing a value of a RI adopted by the network device for transmitting downlink data to the terminal or a value of a RI of a channel determined by the terminal; determining, by the network device, a first-level precoding matrix based on the received CSI and beamforming vectors corresponding to the A antenna ports; and determining, by the network device, a precoding matrix for transmission based on the first-level precoding matrix.

In still yet another aspect, the present disclosure provides in some embodiments a network device, including: a reception unit configured to receive CSI from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, $L \le Q \le A$, L representing a value of a RI adopted by the network device for transmitting downlink data to the terminal or a value of a RI of a channel determined by the terminal; a first determination unit configured to determine a first-level precoding matrix based on the received CSI and beamforming vectors corresponding to the A antenna ports; and a second determination unit configured to determine a precoding matrix for transmission based on the first-level precoding matrix.

In still yet another aspect, the present disclosure provides in some embodiments a network device, including a processor, a memory and a transceiver. The processor is configured to read a program stored in the memory, so as to: receive CSI from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, L≤Q≤A, L representing a value of a RI adopted by the network device for transmitting downlink data to the terminal or a value of a RI of a channel determined by the terminal; determine a first-level precoding matrix based on the received CSI and beamforming vectors corresponding to the A antenna ports; and determine a precoding matrix for transmission based on the first-level precoding matrix. The transceiver is configured to receive and transmit data.

In still yet another aspect, the present disclosure provides in some embodiments a terminal, including a processor, a memory and a transceiver. The processor is configured to read a program stored in the memory, so as to: perform channel estimation on a received pilot signal to acquire channel estimation values of A antenna ports for transmitting the pilot signal to a network device; determine Q antenna ports based on the channel estimation values of the A antenna ports, L≤Q≤A, L representing a value of a RI adopted by the network device in the case of transmitting downlink data to the terminal or a value of a RI of a channel determined by the terminal; and determine a first-level PMI based on the Q antenna ports, and feed back CSI containing the first-level PMI to the network device, the first-level PMI being used to indicate indices of the Q antenna ports among the A antenna ports for transmitting the pilot signal. The transceiver is configured to receive and transmit data.

According to the CSI acquisition method and the network device in the embodiments of the present disclosure, the CSI received by the network device from the terminal at least includes the first-level PMI. The first-level PMI is determined by the terminal based on the Q antenna ports which is determined by the terminal based on the channel estimation values of the A antenna ports, and it may reflect the CSI of each terminal to some extent. As a result, in the case of being applied to the massive MIMO system, it is able to simplify the design of the massive MIMO system by use of its characteristics.

DETAILED DESCRIPTION OF THE EMBODIMENTS

The following description is given by taking an Orthogonal Frequency Division Multiplexing (OFDM) system, e.g., an LTE-Advanced system, as an example, and unless otherwise specified, with respect to merely one subcarrier. In the following embodiments of the present disclosure, a lowercase bold letter represents a column vector, an uppercase bold letter represents a matrix, $\otimes$ represents a Kronecker product, a superscript "T" represents transposition of a matrix or vector, and a superscript "H" represents conjugate transposition of the matrix or vector.

Figure 1:
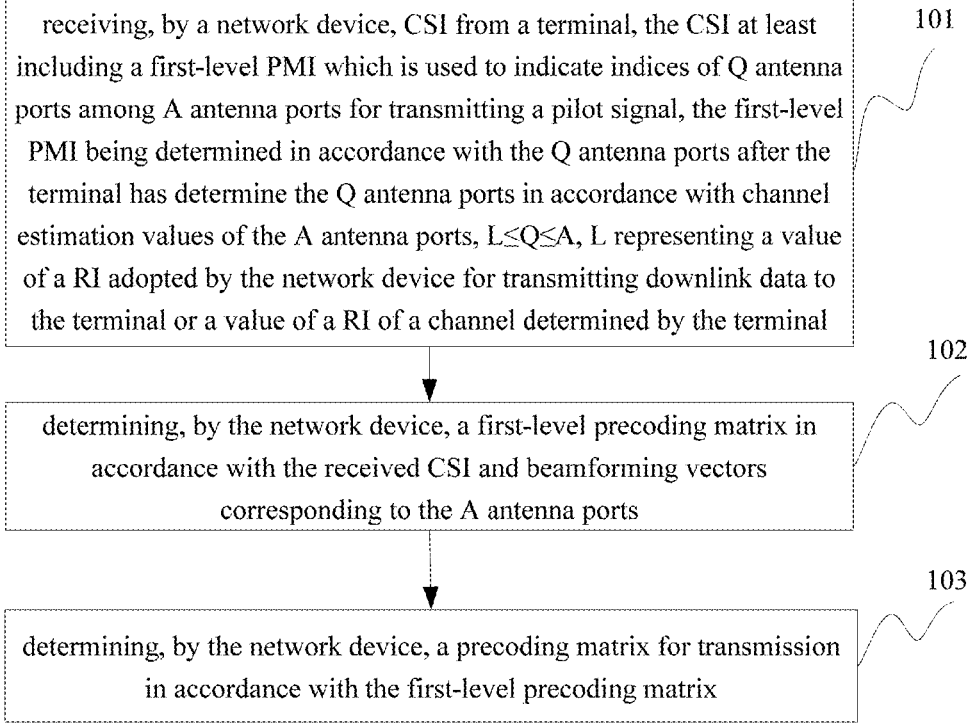
FIG. 1 is a flow chart of a CSI acquisition method according to one embodiment of the present disclosure.

The present disclosure provides in some embodiments a CSI acquisition method which, as shown in FIG. 1, includes the following steps.

Step 101: receiving, by a network device, CSI feedback from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, L≤Q≤A, L representing a value of a RI adopted by the network device for transmitting downlink data to the terminal or a value of a RI of a channel determined by the terminal.

It should be appreciated that, the terminal may determine the value of the RI in various ways, which will not be particularly defined herein. Upon the determination of the value of the RI, the terminal may probably transmit the value of the RI, as a part of the CSI, to the network device. Then, the network device may determine data layers adopted during transmitting the downlink data to the terminal as well as the number of the data layers based on the received value of the RI.

A value of L may be determined according to the practical conditions. For example, in a Single-User (SU-MIMO) system, usually the data layers adopted by the network device during transmitting the downlink data to the terminal as well as the number of the data layers are equal to the value of the RI from the terminal. At this time, L represents the value of the RI adopted by the network device for transmitting downlink data to the terminal or the value of the RI of the channel determined by the terminal. For another example, in a Multi-User MIMO (MU-MIMO) system, the data layers adopted by the network device during transmitting the downlink data to the terminal as well as the number of the data layers may probably not be equal to the value of the RI from the terminal. At this time, L represents the value of the RI of the channel determined by the terminal.

Step 102: determining, by the network device, a first-level precoding matrix based on the received CSI and beamforming vectors corresponding to the A antenna ports.

Step 103: determining, by the network device, a precoding matrix for transmission based on the first-level precoding matrix.

Prior to Step 101, the network device may transmit the pilot signal to the terminal via the A antenna ports.

In a possible embodiment of the present disclosure, the transmission of the pilot signal by the network device to the terminal via the A antenna ports will be described as follows.

Step 1: the network device may determine the A antenna ports for transmitting the pilot signal, a spatial beam direction corresponding to each antenna port, and resources for the transmission of the pilot signal. Each antenna port corresponds to one spatial beam direction.

Figure 2:
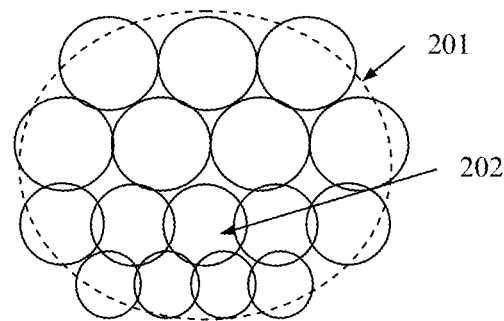
FIG. 2 is a schematic view showing a coverage range that shall be covered by spatial beam directions.

To be specific, in Step 1, the network device needs to determine an antenna corresponding to each antenna port for transmitting the pilot signal and the required time/frequency resources while determining the A antenna ports for transmitting the pilot signal. Each antenna port corresponds to all or parts of the antennae of the network device. If the number of the to-be-formed spatial beam directions is larger than the number of the configurable antenna ports, a plurality of groups of pilot processes, e.g., a CSI-RS process for an LTE system, and all the pilot processes may be transmitted through orthogonal time/frequency resources. In addition, all the spatial beam directions corresponding to the antenna ports contained in all the pilot processes shall cover an entire to-be-covered space as possible, as shown in FIG. 2. In FIG. 2, a dotted line 201 is used to define a spatial range that shall be covered by all the spatial beam directions, and a solid line 202 is used to define a spatial range covered by one spatial beam direction.

The network device may determine the spatial beam direction corresponding to each antenna port, the number of the beams in each direction and a beam width based on the distribution of terminals. Each antenna port may occupy at least one time/frequency resource, and when a Code Division Multiplexing (CDM) mode is adopted by a plurality of antenna ports, more than one time/frequency resources may be occupied by each antenna port.

Step 2: the network device may, with respect to each antenna port among the A antenna ports, determine a beamforming vector in a first dimension and a beamforming vector in a second dimension for the spatial beam direction corresponding to each antenna port, and determine a 3D spatial beamforming vector of a beam corresponding to the antenna port based on the beamforming vector in the first dimension and the beamforming vector in the second dimension.

For a massive MIMO system, usually an antenna array for the network device is a 2D URA, which includes $N_T$ transmitting antennae. There are $N_x$ antennae in the first dimension and Y antennae in the second dimension, $N_T=N_xN_y$, where the first dimension is a vertical dimension and the second dimension is a horizontal dimension, or the first dimension is a horizontal dimension and the second dimension is a vertical dimension.

In Step 2, when the pilot signal is transmitted by the network device, a set of the A antenna ports contained in all the pilot processes may be represented as $\omega=_A\{1, 2, \ldots, A\}$, and any antenna port a ($a \in \omega_A$) may occupy M ($M \geq 1$) time/frequency resources. The following description will be given when the antenna port a ($a \in \omega_A$) corresponds to all antennae of the network device.

In the case that the antenna port a corresponds to all antennae of the network device, a spatial beamforming vector in the first dimension for the spatial beam direction corresponding the antenna port a may be calculated through the following equation: $w_x^{(a)}=[w_{x,1}^{(a)}, w_{x,2}^{(a)}, \ldots, w_{x,N_x}^{(a)}]^T$ (1), where $w_{x,u}^{(a)}$ represents a beamforming weight corresponding to a $u^{th}$ antenna in the first dimension in the antenna port a, and $1 \leq u \leq Nx$. A spatial beamforming vector in the second dimension for the spatial beam direction corresponding to the antenna port a may be calculated through the following equation: $w_y^{(a)}=[w_{y,1}^{(a)}, w_{y,2}^{(a)}, \ldots, w_{y,N_y}^{(a)}]^T$ (2), where $w_{y,u}^{(a)}$ represents a beamforming weight corresponding to the $u^{th}$ antenna in the second dimension in the antenna port a, and $1 \leq u \leq Ny$. Then, a 3D spatial beamforming vector for a beam corresponding to the antenna port a may be calculated through the following equation: $w^{(a)}=w_x^{(a)} \otimes w_y^{(a)}$ (3). Hence, a vector of the pilot signal beamformed by all the antennae and transmitted through the antenna port a on an $m^{th}$ time/frequency resource may be calculated through the following equation: $s^{(a,m)}=w^{(a)}p^{(a,m)}$, where $p^{(a,m)}$ represents a pilot symbol on the $m^{th}$ time/frequency resource.

Figure 3:
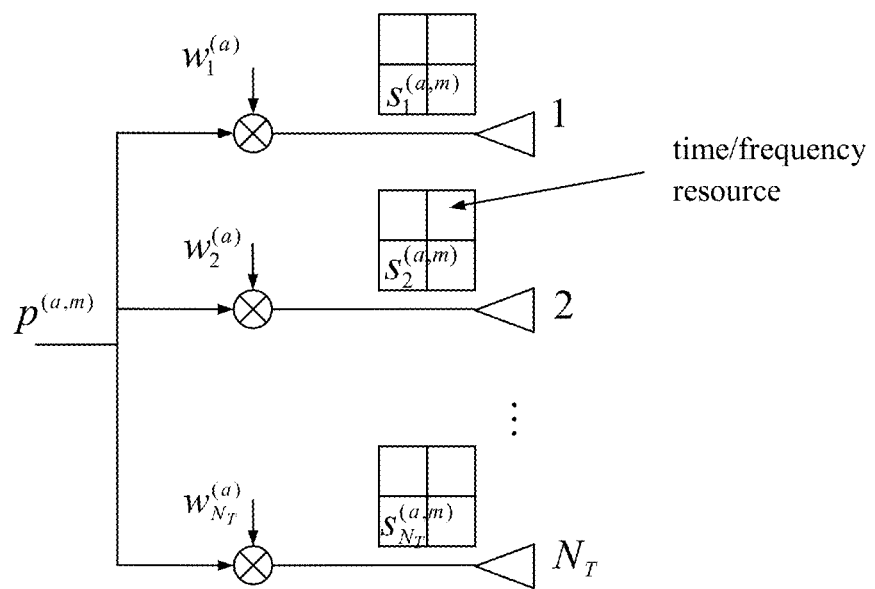
FIG. 3 is a schematic view showing the transmission of a pilot signal on all antennae through antenna ports for a network device according to one embodiment of the present disclosure.

To be specific, as shown in FIG. 3 which is a schematic view showing the transmission of the pilot signal by the network device through the antenna port a on all the $N_T$ antennae, for the antenna port a, when the pilot symbol $p^{(a,m)}$ on the $m^{th}$ time/frequency resource is mapped onto each antenna, each antenna may multiply the pilot symbols $p^{(a,m)}$ by a beamforming weight coefficient to acquire a vector of the pilot signal beamformed by all the antennae. In FIG. 3, $w_j^{(a)}$ represents the beamforming weight coefficient corresponding to a $j^{th}$ antenna in the antenna port a, $s_j^{(a,m)}=w_j^{(a)}p^{(a,m)}$ a represents the pilot signal transmitted through the $j^{th}$ antenna on the time/frequency resource corresponding to the antenna port a, and $1 \leq j \leq N_T$.

In Step 2, the pilot signal transmitted through the antenna port a on the $m^{th}$ time/frequency resource may also be transmitted through parts of the antennae corresponding to the antenna port a in the spatial beam direction, e.g., through all or parts of antennae with an identical polarization direction corresponding to an antenna port of a cross-polarization 2D URA.

When the antenna port a corresponds to parts of the antennae for the network device, the beamforming vector $w^{(a)}$ merely needs to be multiplied by a beamforming weight coefficient $w_j^{(a)}$ with respect to parts of the antennae, where $w_j^{(a)}$ represents a beamforming weight coefficient of a $j^{th}$ antenna participating in the formation of the antenna port a, and the beamforming weight coefficients of the other antennae not participating in the formation of the antenna port a may be considered as 0. For example, with respect to the antenna ports of the cross-polarization 2D URA, for any antenna ports $a_i$ and $a_j$ ($a_i, a_j \in \omega_A$) the spatial beam directions are formed through the antennae with an identical polarization direction, and the beamforming vector may be calculated through the following equation: $w^{(a_i)}=[(w_{/,x}^{(a_i)} \otimes w_{/,y}^{(a_i)})^T, 0, \ldots, 0]^T$ (4) or $w^{(a_j)}=[0, \ldots, 0, (w_{\backslash,x}^{(a_j)} \otimes w_{\backslash,y}^{(a_j)})^T]^T$ (5), $w^{(a_j)}$ where $w^{(a_i)}$ and $w^{(a_j)}$ represent the beamforming vectors of the antenna ports $a_i$ and $a_j$ in two polarization directions respectively, $w_{/,x}^{(a_i)}$ and $w_{/,y}^{(a_i)}$ represent the beamforming vectors of the antenna port $a_i$ in the first dimension and the second direction in the polarization directions respectively, and $w_{\backslash,x}^{(a_j)}$ and $w_{\backslash,y}^{(a_j)}$ represent the beamforming vectors of the antenna port $a_j$ in the first direction and the second direction in the polarization directions respectively.

Step 3: the network device may beamform and transmit the pilot signal based on the 3D spatial beamforming vector of each antenna port in the A antenna ports and the time/frequency resource for the pilot signal.

In Step 3, the network device may transmit the pilot signal through the antenna corresponding to the antenna port.

As mentioned above, each antenna port corresponds to one spatial beam direction, so it is able to replace the measurement of the MIMO channel matrix by the terminal with the measurement and selection of the spatial beam direction, thereby to reduce the pilot frequency overhead of the terminal during the measurement of the CSI.

In Step 101, the CSI received by the network device at least includes the first-level PMI. The network device may determine, based on the first-level PMI, the Q antenna ports among the A antenna ports for transmitting the pilot signal selected by the terminal, and then form the first-level precoding matrix based on the Q beamforming vectors corresponding to the Q antenna ports selected by the terminal.

The CSI received by the network device may further include one or more of a second-level PMI, a RI and a Channel Quality Indicator (CQI). The second-level PMI is used to indicate an index of a second-level precoding matrix in a second-level codebook set. The second-level precoding matrix is a power-normalized Q*L matrix, and it is represented by $V_L$. The second precoding matrix $V_L$ may be acquired by performing Singular Value Decomposition (SVD) to acquire a matrix consisting of L singular vectors corresponding to L maximum singular values and then performing power normalization and quantization, or it may also be specified in the second-level codebook set based on the second-level PMI and the RI. The RI is a channel rank indicator reported by the terminal to the network device. Through reporting the RI, the network device may determine the number of valid data layers for a Physical Downlink Shared Channel (PDSCH) supported by the terminal. The terminal may determine the RI to be reported to the network device in various ways, which will not be particularly defined herein. The CQI is a quantized value of a Signal-to-Interference plus Noise Ratio (SINR), and it may be determined as follows. A first equivalent channel consisting of Q channel estimation values corresponding to the Q antenna ports may be determined based on the first-level PMI, the second-level precoding matrix may be determined based on the second-level PMI and the RI, a second equivalent channel maybe determined based on the first equivalent channel and the second-level precoding matrix, the SINR may be determined based on the second equivalent channel, power of an interference signal and power of a noise signal, and then the CQI may be determined based on the SINR.

When the RI is 1, the Q antenna ports selected by the terminal may be $a_1, a_2, \ldots, a_Q$ and the second-level precoding matrix is a column vector $v_1$ having Q×1 dimensions, where $N_R$ represents the number of reception antennae of the terminal. The SINR may be calculated through the following equation: $\gamma_1 = \|(Q)^{-1/2}\hat{H}v_1\|^2/(\sigma_i^2+\sigma_n^2)$ (6), where $\gamma_1$ represents the SINR, $\sigma_i^2$ represents the power of the interference signal, $\sigma_n^2$ represents the power of the noise signal, $\|\cdot\|$ represents a norm of the matrix, $\hat{H}=[\hat{H}^{(a_1)}, \hat{H}^{(a_2)}, \ldots, \hat{H}^{(a_Q)}]$ and it represents the first equivalent channel having $N_R \times Q$ dimensions and it is acquired by the terminal through directly measuring and selecting the A antenna ports, $\hat{H}^{(a)}=Hw^{(a)}$ and it represents a channel estimation value of an $a^{th}$ ($a \in \omega_A$) antenna port and has $N_R \times 1$ dimensions, and H is a channel matrix on a subcarrier and has $N_R \times N_T$ dimensions.

Generally, the CSI received by the network device from the terminal includes the first-level PMI, the number Q of the antenna ports selected by the terminal, the second-level PMI, the RI and the CQI. When the network device has specified that the value of the RI for the transmission of the downlink data to the terminal is 1 and has specified that merely one antenna port is capable of being selected by the terminal after the measurement of the A antenna ports (i.e., Q=1), the CSI received by the network device from the terminal may not include the number Q of the antenna ports selected by the terminal as well as the second-level PMI.

In Step 102, after the network device has received from the terminal the CSI including the first-level PMI, it may determine the Q antenna ports selected by the terminal from the A antenna ports for transmitting the pilot signal based on the first-level PMI, and form the first-level precoding matrix based on the Q beamforming vectors corresponding to the Q antenna ports.

To be specific, when the Q antenna ports selected by the terminal and indicated in the first-level PMI include $a_1, a_2, \ldots a_Q$, the first-level precoding matrix to be acquired by the network device may be calculated through the following equation: $W_1=[w^{(a_1)}, w^{(a_2)} \ldots w^{(a_Q)}]$ (7), where $W_1$ represents the first-level precoding matrix, and $w^{(a)}$ represents the beamforming vector corresponding to the antenna ports $a (a \in \omega_A)$.

In the design of the antenna ports of the cross-polarization 2D URA, for any antenna port, the spatial beam direction is formed by the antennae with an identical polarization direction, and these antennae are arranged in a certain dimension in a polarization direction and then in an identical dimension in another polarization direction. The first-level precoding matrix may be further calculated through the following equation:

$$W_1 = \begin{bmatrix} w^{(a_1)} & w^{(a_2)} & \ldots & w^{(a_Q)} \end{bmatrix}$$
$$= \begin{bmatrix} w^{(a_1)} & \ldots & w^{(a_i)} & 0 & \ldots & 0 \\ 0 & \ldots & 0 & w^{(a_{i+1})} & \ldots & w^{(a_Q)} \end{bmatrix}$$

(8), where the antenna ports $a_1, \ldots, a_i$ correspond to one polarization direction, and the antenna ports $a_{i+1}, \ldots, a_Q$ correspond to the other polarization direction.

In Step 103, the network device may determine the precoding matrix for transmission based on the first-level precoding matrix.

To be specific, the network device may determine the precoding matrix for transmission based on the following equation: $W=P^{-1/2}W_1V_L$ (9), where W represents the precoding matrix for transmission, $W_1$ represents the first-level precoding matrix having $N_T \times Q$ dimensions, $V_L$ represents the second-level precoding matrix having Q×L dimensions, L represents the value of the RI, and $P^{-1/2}$ represents a power normalization factor.

Upon the determination of the precoding matrix for transmission, the network device may reconstruct a channel matrix from the network device to the terminal based on the precoding matrix for transmission. when it is necessary to reconstruct the channel matrix from the network device to the terminal, the network device may determine the channel matrix from the network device to the terminal through the following equation: $\tilde{H}=W^H$ (10), where $\tilde{H}$ represents the channel matrix, and W represents the precoding matrix for transmission.

With respect to the pilot signal transmitted by the network device through the A antenna ports, each antenna port corresponds to one spatial beam direction, so the measurement of the MIMO channel matrix may be replaced with the measurement of the spatial beam direction at each terminal. The terminal may select a plurality of spatial beams according to the practical need, and calculate the CQI based on the selected spatial beams. Usually, the number of the spatial beams selected by the terminal is far less than the number of the antennae of the network device, so it is able to reduce the pilot frequency overhead of the terminal during the measurement of the CSI.

Figure 4:
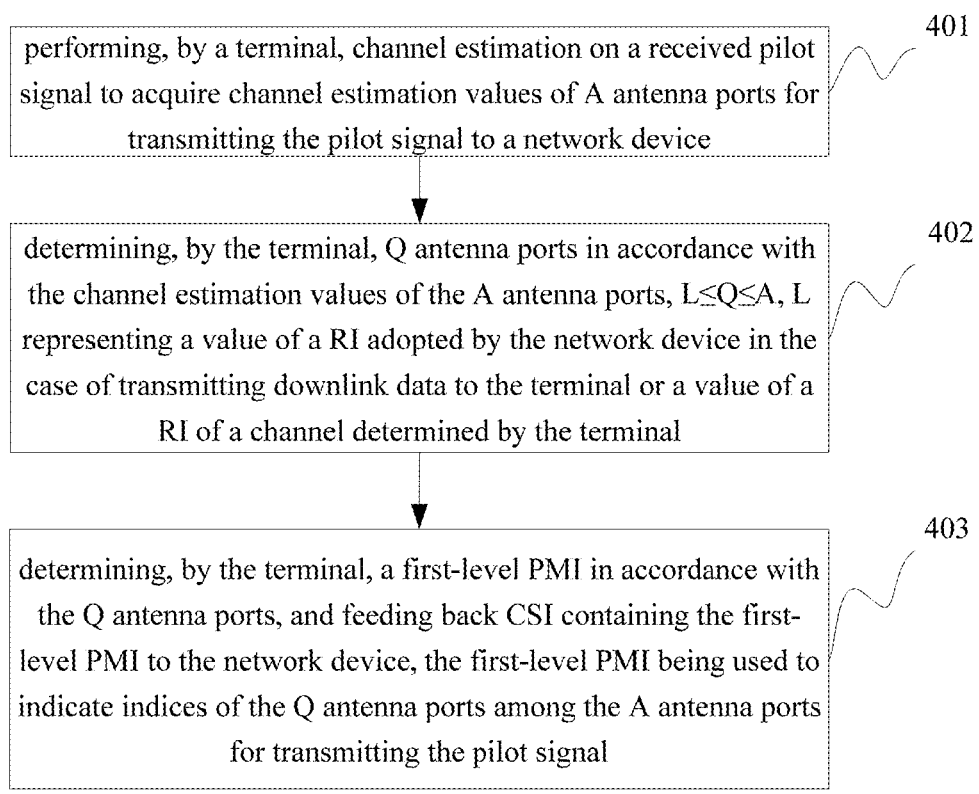
FIG. 4 is a flow chart of a CSI feedback method according to one embodiment of the present disclosure.

The present disclosure further provides in some embodiments a CSI feedback method which, as shown in FIG. 4, includes the following steps.

Step 401: performing, by a terminal, channel estimation based on a received pilot signal to acquire channel estimation values of A antenna ports for transmitting the pilot signal by a network device.

Step 402: determining, by the terminal, Q antenna ports based on the channel estimation values of the A antenna ports, $L \leq Q \leq L$, L representing a value of a RI adopted by the network device during transmitting downlink data to the terminal or a value of a RI of a channel determined by the terminal.

It should be appreciated that, the terminal may determine the value of the RI in various ways, which will not be particularly defined herein. A value of L may refer to that mentioned in Step 101 and thus will not be particularly defined herein.

Step 403: determining, by the terminal, a first-level PMI based on the Q antenna ports, and feeding back CSI containing the first-level PMI to the network device, the first-level PMI being used to indicate indices of the Q antenna ports among the A antenna ports for transmitting the pilot signal.

The transmission of the pilot signal by the network device may refer to that mentioned in FIG. 1, or the pilot signal may be transmitted in any other ways, which will not be particularly defined herein.

In the embodiments of the present disclosure, the number of the reception antennae of the terminal is $N_R$ which is greater than or equal to 1. The antenna port a occupying the $m^{th}$ time/frequency resource belongs to a set of the A antenna ports of the network device, i.e., $\omega_A = \{1, 2, \ldots, A\}$, and the antenna port a corresponds to all the $N_T$ transmission antennae of the network device forming a like-polarization 2D URA. In a possible embodiment of the present disclosure, the transmission antennae form a cross-polarization 2D URA, and the antenna port a corresponds to the antennae of the network device with an identical polarization direction. In addition, the pilot symbol corresponding to the antenna port a is normalized power.

In Step 401, the pilot signal received by the terminal is transmitted by the network device through the A antenna ports. Each of the A antenna ports corresponds to one spatial beam direction and occupies at least one time/frequency resource. When a CDM mode is adopted by a plurality of antenna ports, each antenna port may occupy more than one time/frequency resources. In addition, a 3D spatial beamforming vector corresponding to the spatial beam direction for each antenna port is determined based on a beamforming vector of the antenna port in a first dimension and a beamforming vector of the antenna port in a second dimension. The first dimension is a vertical dimension and the second dimension is a horizontal dimension, or the first dimension is a horizontal dimension and the second dimension is a vertical dimension.

A vector of the pilot signal beamformed by all the antennae and transmitted through the antenna port $a(a \in \omega_A)$ on the $m^{th}$ time/frequency resource may be calculated through the following equation: $s^{(a,m)} = w^{(a)} p^{(a,m)}$, where $w^{(a)}$ represents a 3D spatial beamforming vector of a beam corresponding to the antenna port a, and $p^{(a,m)}$ represents the pilot symbol on the $m^{th}$ time/frequency resource. At this time, a channel matrix on one subcarrier from the network device to the terminal is a matrix H having $N_R \times N_T$ dimensions. The pilot signal received by the terminal on the $m^{th}$ time/frequency resource occupied by the antenna port a may be a vector having $N_R \times 1$ dimensions: $r^{(a,m)} = Hs^{(a,m)} + i^{(a,m)} + n^{(a,m)} = Hw^{(a)}p^{(a,m)} + i^{(a,m)} + n^{(a,m)}$ (11), where $s^{(a,m)}$ represents the vector of the pilot signal having $N_T \times 1$ dimensions, beamformed by all the antennae and transmitted through the antenna port a on the $m^{th}$ time/frequency resource, and $i^{(a,m)}$ and $n^{(a,m)}$ represent a vector of an interference signal having $N_R \times 1$ dimensions and a vector of a noise signal having $N_R \times 1$ dimensions respectively.

Based on the pilot signal on the time/frequency resource occupied by each antenna port, the terminal may acquire A channel estimation values corresponding to the A antenna ports for transmitting the pilot signal. The channel estimation channel of the antenna port a may be calculated through the following equation: $\hat{H}^{(a)} = Hw^{(a)} + E^{(a)}$ (12), where $w^{(a)}$ represents the 3D spatial beamforming vector of the antenna port a, $E^{(a)}$ represents a channel estimation error matrix of the antenna port a, and $a \in \omega_A$. The terminal may acquire the channel estimation values $\hat{H}^{(1)}, \hat{H}^{(2)}, \ldots,$ and $\hat{H}^{(A)}$ of the A antenna ports.

In Step 402, the terminal needs to select the Q antenna ports from the A antenna ports based on the channel estimation values of the A antenna ports, so as to determine the CSI and feed it back to the network device.

Considering the calculation complexity of determining the CSI based on the selected Q antenna ports, the terminal may select one antenna port so as to determine the CSI. However, due to a plurality of scatters on a transmission path, the pilot signal may probably be acquired by the terminal through superimposing signals on a plurality of transmission paths. In order to acquire the CSI in an accurate manner, it is necessary for the terminal to determine all possible combinations of the antenna ports within a range of the number of the antenna ports, and determine, among all the possible combinations of the antenna ports, the Q antenna ports so as to provide maximum throughput or capacity of the channel between the terminal and the network device or provide maximum received pilot signal power of the terminal. The throughput or capacity of the channel or the received pilot signal power of the terminal corresponding to each possible combination of the antenna ports may be determined based on the channel estimation value corresponding to the possible combination of the antenna ports.

The number of the antenna ports is usually greater than or equal to the RI L of the channel, and smaller than or equal to A. The network device may also specify an upper limit of the range of the number of the antenna ports, e.g., $Q_{max}$.

In addition, the network device may also specify, for the terminal, the number of the antenna ports to be selected, e.g., Q, where $L \leq Q \leq A$. At this time, it is merely necessary for the terminal to select Q combinations of antenna ports from the A antenna ports so as to provide the maximum throughput or capacity of the channel between the terminal and the network device or provide the maximum received pilot signal power of the terminal. When the network device fails to specify the number of the antenna ports to be selected or the upper limit of the range of the number of the antenna ports, a lower limit of the range of the number of the antenna ports to be selected by the terminal may be greater than or equal to L, and the upper limit thereof may be equal to the number of the antenna ports for transmitting the pilot signal, i.e., smaller than or equal to A.

No matter whether the network device has specified for the terminal the number of the antenna ports to be selected by the terminal, there is a plurality of combinations of antenna ports among the A antenna ports for the terminal to select. By taking the calculation of the throughput or capacity of the channel between the terminal and the network device as an example, the terminal may determine a set of Q antenna ports with the maximum throughput or capacity from the A antenna ports through the following equation:

$$\omega_Q = \underset{\omega'_{Q'} \in \{\Omega_L, \Omega_{L+1}, \cdots, \Omega_{Q_{max}}\}}{\operatorname{argmax}} f\left((P')^{-\frac{1}{2}} \hat{H}_{\omega'_{Q'}}, V_L, i+n\right), \quad (13)$$

where $$f\left((P')^{-\frac{1}{2}} \hat{H}_{\omega'_{Q'}}, V_L, i+n\right)$$

represents a function for calculating the throughput or capacity of the channel between the terminal and the network device (it is known in the art and thus will not be particularly defined herein), $Q_{max}$ represents the upper limit of the range of the number of the antenna ports to be selected by the terminal, $L \leq Q_{max} \leq A$, $\omega_k$ represents the set of k antenna ports selected from the A antenna ports, $\Omega_k$ represents a set of all possible $\omega_k$ in the case of selecting the k antenna ports from the A antenna ports, $L \leq k \leq Q_{max}$, $$\hat{H}_{\omega'_{Q'}}$$

represents the first equivalent channel consisting of the channel estimation values corresponding to the k antenna ports selected from the A antenna ports, $V_L$ may be acquired by performing SVD on $$\hat{H}_{\omega'_{Q'}}$$

to acquire a matrix consisting of L singular vectors corresponding to L maximum singular values and then performing power normalization and quantization, or it may also be selected from the second-level codebook set, i represents an interference signal vector, n represents a noise signal vector, and P' represents a power normalization factor of the precoding matrix.

When L=1, the second-level precoding matrix may be degenerated into a column vector having Q×1 dimensions. When L=1 and the network device has specified that $Q_{max}=1$, the second-level precoding matrix may be further degenerated into a scalar $v_1=1$. At this time, it is merely necessary to select from the A antenna ports the antenna ports with a maximum square of the norm of the channel estimation values, i.e., with the maximum received signal power.

The terminal may calculate each possible combination of antenna ports among the A antenna ports, and then select one combination of Q antenna ports so as to provide the maximum throughput or capacity of the channel between the terminal and the network device or provide the maximum received pilot signal power of the terminal, so the calculation burden is very heavy. In order to reduce the calculation complexity, a greedy method may be used to search for the combinations of antenna ports. A basic concept of the greedy method lies in increasing the number of the antenna ports to be used gradually, until the throughput or capacity of the channel or the received pilot signal power of the terminal does not increase or reaches a maximum available RI. The greedy method will be described in more details as follows.

Figure 5:
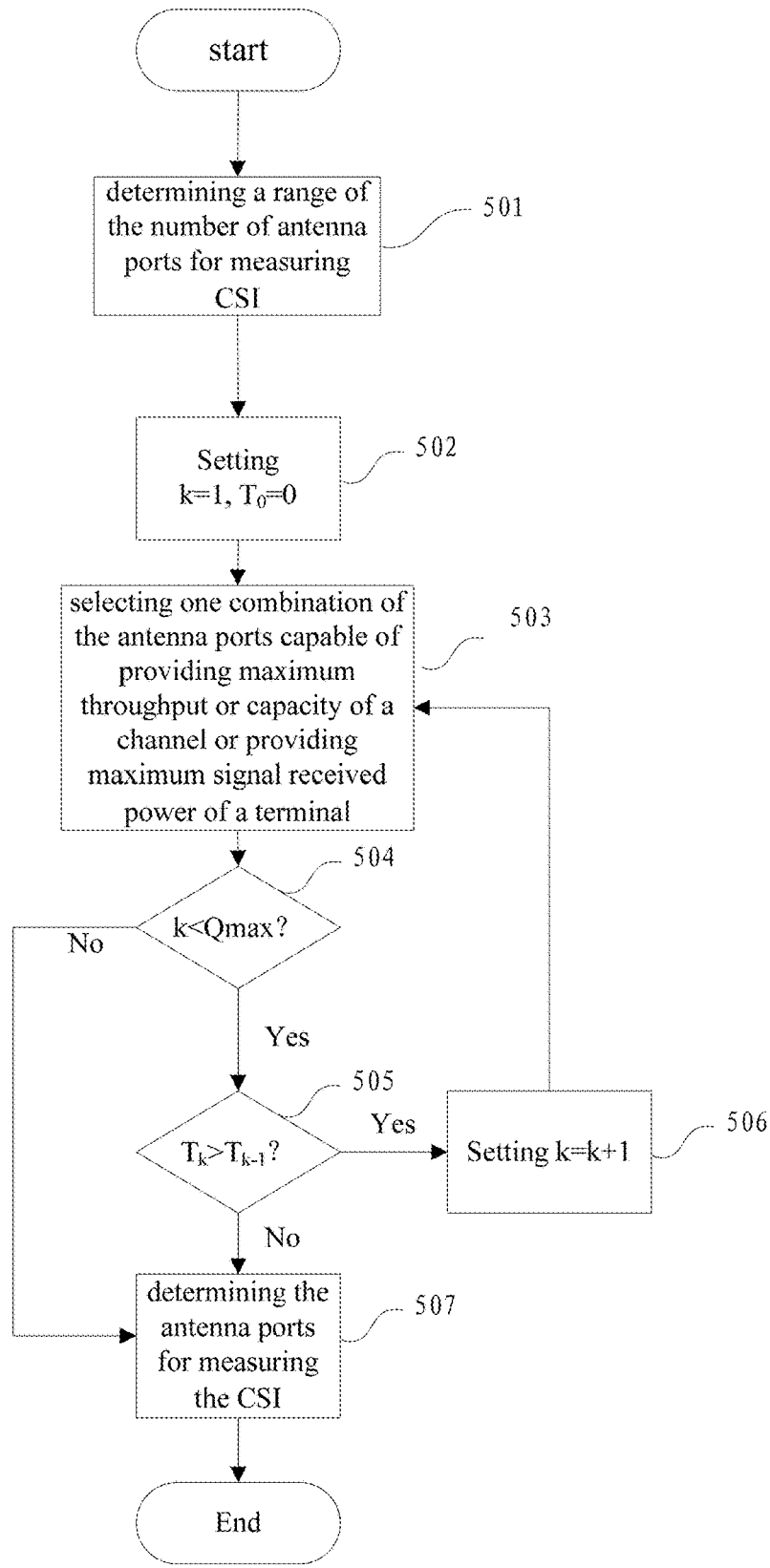
FIG. 5 is another flow chart of the CSI acquisition method according to one embodiment of the present disclosure.

As shown in FIG. 5, the greedy method may include the following steps.

Step 501: determining the range of the number of the antenna ports for measuring the CSI.

Step 502: setting k=1 and T0=0.

Step 503: When the k antenna ports are selected from the A antenna ports, determining the throughput or capacity corresponding to each possible combination of antenna ports or the received pilot signal power of the terminal, and selecting one combination of the antenna ports capable of providing the maximum throughput or capacity of the channel or providing the maximum received pilot signal power of the terminal.

Step 504: when k<$Q_{max}$, proceeding to Step 505, and otherwise proceeding to Step 507, where $Q_{max}$ represents the upper limit of the range, and $L \leq Q_{max} \leq A$.

Step 505: when $T_k > T_{k-1}$, proceeding to Step 506, and otherwise proceeding to Step 507. $T_k$ represents the throughput or capacitor of the channel or the received pilot signal power corresponding to the combination of antenna ports with the maximum throughput or capacitor of the channel or the maximum received pilot signal power of the terminal when the k antenna ports are selected form the A antenna ports, and $T_{k-1}$ represents the throughput or capacitor of the channel or the received pilot signal power of the terminal corresponding to the combination of antenna ports with the maximum throughput or capacitor of the channel or the maximum received pilot signal power when the k-1 antenna ports are selected from the A antenna ports.

Step 506: setting k=k+1, and proceeding to Step 503.

Step 507: determining the antenna ports in the currently-determined combination of antenna ports with the maximum throughput or capacitor of the channel or the maximum received pilot signal power of the terminal as the antenna ports for measuring the CSI.

Upon the determination of the Q antenna ports for measuring the CSI, the terminal may determine the CSI to be fed back to the network device. To be specific, in Step 403, the CSI determined by the terminal may at least include the first-level PMI which is used to indicate the indices of the Q antenna ports for measuring the CSI in the A antenna ports for transmitting the pilot signal. Further, the CSI determined by the terminal may include one or more of a second-level PMI, a RI and a CQI. The second-level PMI is used to indicate an index of a second-level precoding matrix in a second-level codebook set. The second-level precoding matrix $V_L$ is a power-normalized Q×L matrix. The second precoding matrix $V_L$ may be acquired by performing SVD to acquire a matrix consisting of L singular vectors corresponding to L maximum singular values and then performing power normalization and quantization, or it may also be selected from the second-level codebook set. The RI is a channel rank indicator reported by the terminal to the network device. Through reporting the RI, the network device may determine the number of valid data layers for a PDSCH supported by the terminal. The CQI may be determined as follows. A first equivalent channel consisting of Q channel estimation values corresponding to the Q antenna ports may be determined based on the first-level PMI, the second-level precoding matrix may be determined based on the second-level PMI and the RI, a second equivalent channel maybe determined based on the first equivalent channel and the second-level precoding matrix, the SINR may be determined based on the second equivalent channel, power of an interference signal and power of a noise signal, and then the CQI may be determined based on the SINR.

Generally, the CSI fed back by the terminal includes the first-level PMI, the number Q of the antenna ports selected by the terminal, the second-level PMI, the RI and the CQI. When the network device has specified that the value of the RI for the transmission of the downlink data to the terminal is 1 and has specified that merely one antenna port is capable of being selected by the terminal from the A antenna ports for the CSI measurement, the CSI fed back by the terminal to the network device may not include the number Q of the antenna ports selected by the terminal as well as the second-level PMI.

The present disclosure further provides in some embodiments a network device and a terminal. The implementation of the network device and the terminal may refer to those mentioned above, and thus will not be particularly defined herein.

Figure 6:
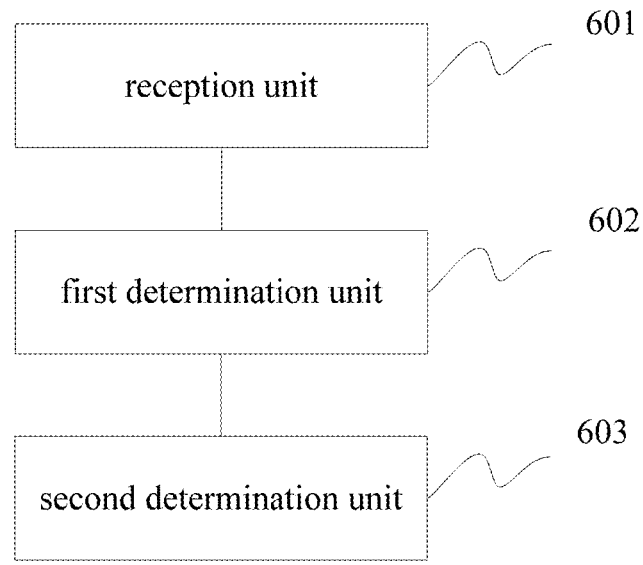
FIG. 6 is a schematic view showing the network device according to one embodiment of the present disclosure.

As shown in FIG. 6, the present disclosure provides in some embodiments a network device, which includes: a reception unit 601 configured to receive CSI from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, $L \leq Q \leq A$, L representing a value of a RI adopted by the network device for transmitting downlink data to the terminal or a value of a RI of a channel determined by the terminal; a first determination unit 602 configured to determine a first-level precoding matrix based on the received CSI and beamforming vectors corresponding to the A antenna ports; and a second determination unit 603 configured to determine a precoding matrix for transmission based on the first-level precoding matrix.

In a possible embodiment of the present disclosure, the CSI received by the reception unit 601 may further include one or more of: a second-level PMI used to indicate an index of a second-level precoding matrix in a second codebook set; a RI and a CQI.

In a possible embodiment of the present disclosure, the second determination unit 603 is further configured to determine the precoding matrix for transmission through the following equation: $W = P^{-1/2} W_1 V_L$, where W represents the precoding matrix for transmission, $W_1$ represents the first-level precoding matrix, $V_L$ represents the second-level precoding matrix which is a matrix indicated by the second-level PMI, L represents the value of the RI, and $P^{-1/2}$ represents a power normalization factor.

In a possible embodiment of the present disclosure, the reception unit 601 is further configured to: determine the A antenna ports for transmitting the pilot signal, a transmission antenna corresponding to each antenna port, a spatial beam corresponding to each antenna port, and a resource for the transmission of the pilot signal, each antenna port corresponding to one spatial beam; with respect to each antenna port in the A antenna ports, determine a beamforming vector in a first dimension of the spatial beam corresponding to each antenna port and a beamforming vector in a second dimension of the spatial beam corresponding to each antenna port, and determine a 3D spatial beamforming vector of a beam corresponding to the antenna port based on the beamforming vector in the first dimension and the beamforming vector in the second dimension; and beamform the pilot signal based on the 3D spatial beamforming vector of the beam corresponding to each antenna port in the A antenna ports and the resource for the transmission of the pilot signal, and transmit the beamformed pilot signal through all or parts of the transmission antennae.

In a possible embodiment of the present disclosure, the first determination unit 602 is further configured to determine, based on the distribution of the terminals, a direction of a spatial beam corresponding to each antenna port, the number of spatial beams in each direction, and a width of each spatial beam.

Figure 7:
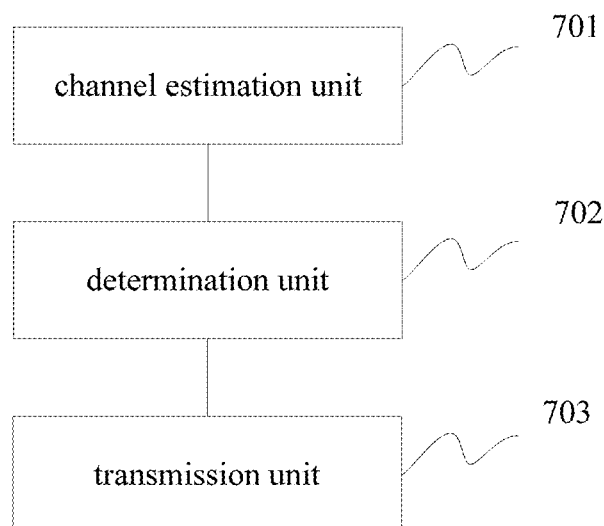
FIG. 7 is a schematic view showing a terminal according to one embodiment of the present disclosure.

As shown in FIG. 7, the present disclosure further provides in some embodiments a terminal, including: a channel estimation unit 701 configured to perform channel estimation on a received pilot signal to acquire channel estimation values of A antenna ports for transmitting the pilot signal to a network device; a determination unit 702 configured to determine Q antenna ports based on the channel estimation values of the A antenna ports, $L \leq Q \leq A$, L representing a value of a RI adopted by the network device in the case of transmitting downlink data to the terminal or a value of a RI of a channel determined by the terminal; and a transmission unit 703 configured to determine a first-level PMI based on the Q antenna ports, and feed back CSI containing the first-level PMI to the network device, the first-level PMI being used to indicate indices of the Q antenna ports among the A antenna ports for transmitting the pilot signal.

In a possible embodiment of the present disclosure, the CSI fed by the transmission unit 703 to the network device may further include one or more of: a second-level PMI used to indicate an index of a second-level precoding matrix in a second codebook set; a RI and a CQI.

In a possible embodiment of the present disclosure, the CQI may be determined by: determining a first equivalent channel consisting of Q channel estimation values corresponding to the Q antenna ports based on the first-level PMI; determining a second-level precoding matrix based on the second-level PMI and the RI; determining a second equivalent channel based on the first equivalent channel and the second-level precoding matrix; determining an SINR based on the second equivalent channel, power of an interference signal and power of a noise signal; and determining the CQI based on the SINR.

In a possible embodiment of the present disclosure, the determination unit 702 is further configured to determine, within a range of the number of the antenna ports, all possible combinations of antenna ports, and determine, from all the possible combinations of antenna ports, Q antenna ports capable of providing maximum throughput or capacity of a channel between the terminal and the network device or providing maximum received pilot signal power of the terminal, the throughput or capacity of the channel corresponding to each possible combination of antenna ports or the received pilot signal power of the terminal being determined based on the channel estimation value corresponding to the possible combination of antenna ports.

In a possible embodiment of the present disclosure, the determination unit 702 is further configured to determine the Q antenna ports through: Step A of determining the range of the number of the antenna ports for measuring the CSI; Step B of setting $k=1$ and $T_0=0$; Step C of, when k antenna ports are selected from the A antenna ports, determining the throughput or capacity corresponding to each possible combination of antenna ports or the received pilot signal power of the terminal, and selecting one combination of the antenna ports capable of providing the maximum throughput or capacity of the channel or providing the maximum received pilot signal power of the terminal; Step D of, when $k<Q_{max}$, proceeding to Step E, and otherwise proceeding to Step G, $Q_{max}$ representing an upper limit of the range, and $L \le Q_{max} \le A$; Step E of, when $T_k > T_{k-1}$, proceeding to Step F, and otherwise proceeding to Step G, $T_k$ representing the throughput or capacitor of the channel or the received pilot signal power corresponding to the combination of antenna ports with the maximum throughput or capacitor of the channel or the maximum received pilot signal power of the terminal when the k antenna ports are selected form the A antenna ports, and $T_{k-1}$ representing the throughput or capacitor of the channel or the received pilot signal power of the terminal corresponding to the combination of antenna ports with the maximum throughput or capacitor of the channel or the maximum received pilot signal power when the k−1 antenna ports are selected from the A antenna ports; Step F of setting k=k+1, and proceeding to Step C; and Step G of determining the antenna ports in the currently-determined combination of antenna ports with the maximum throughput or capacitor of the channel or the maximum received pilot signal power of the terminal as the antenna ports for measuring the CSI.

The present disclosure further provides in some embodiments a network device and a terminal. The implementation of the network device and the terminal may refer to those mentioned above, and thus will not be particularly defined herein.

Figure 8:
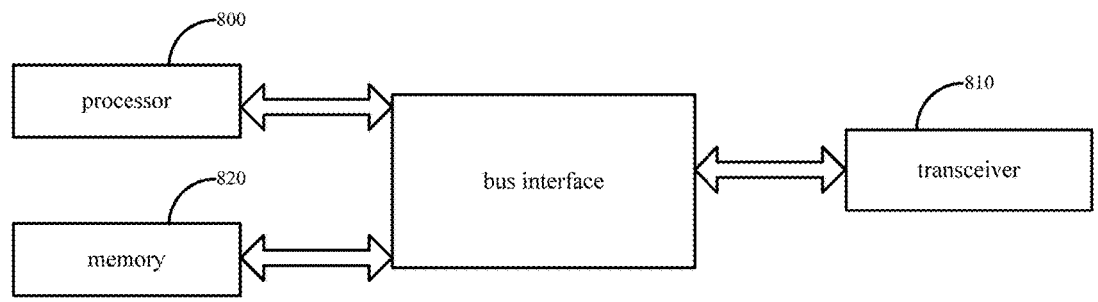
FIG. 8 is a schematic view showing a base station according to one embodiment of the present disclosure.

As shown in FIG. 8, the present disclosure provides in some embodiments a network device, including a processor 800, a transceiver 810 and a memory 820. The processor 800 is configured to read a program stored in the memory 820, so as to: receive CSI from a terminal, the CSI at least including a first-level PMI which is used to indicate indices of Q antenna ports among A antenna ports for transmitting a pilot signal, the first-level PMI being determined based on the Q antenna ports after the terminal has determine the Q antenna ports based on channel estimation values of the A antenna ports, $L \le Q \le A$, L representing a value of a RI adopted by the network device for transmitting downlink data to the terminal or a value of a RI of a channel determined by the terminal; determine a first-level precoding matrix based on the received CSI and beamforming vectors corresponding to the A antenna ports; and determine a precoding matrix for transmission based on the first-level precoding matrix. The transceiver 810 is configured to receive and transmit data under the control of the processor 800.

In a possible embodiment of the present disclosure, the CSI received by the transceiver 810 may further include one or more of: a second-level PMI used to indicate an index of a second-level precoding matrix in a second codebook set, a RI and a CQI.

In a possible embodiment of the present disclosure, the processor 800 is further configured to determine the precoding matrix for transmission through the following equation: $W = P^{-1/2} W_1 V_L$, where W represents the precoding matrix for transmission, $W_1$ represents the first-level precoding matrix, $V_L$ represents the second-level precoding matrix which is a matrix indicated by the second-level PMI, L represents the value of the RI, and $P^{-1/2}$ represents a power normalization factor.

In a possible embodiment of the present disclosure, the processor 800 is further configured to: determine the A antenna ports for transmitting the pilot signal, a transmission antenna corresponding to each antenna port, a spatial beam corresponding to each antenna port, and a resource for the transmission of the pilot signal, each antenna port corresponding to one spatial beam; with respect to each antenna port in the A antenna ports, determining a beamforming vector in a first dimension of the spatial beam corresponding to each antenna port and a beamforming vector in a second dimension of the spatial beam corresponding to each antenna port, and determining a 3D spatial beamforming vector of a beam corresponding to the antenna port based on the beamforming vector in the first dimension and the beamforming vector in the second dimension; and beamform the pilot signal based on the 3D spatial beamforming vector of the beam corresponding to each antenna port in the A antenna ports and the resource for the transmission of the pilot signal, and transmitting the beamformed pilot signal through all or parts of the transmission antennae.

In a possible embodiment of the present disclosure, the processor 800 is further configured to determine, based on the distribution of the terminals, a direction of a spatial beam corresponding to each antenna port, the number of spatial beams in each direction, and a width of each spatial beam.

In FIG. 8, bus architecture may include a number of buses and bridges connected to each other, so as to connect various circuits for one or more processors 800 and one or more memories 820. In addition, as is known in the art, the bus architecture may be used to connect any other circuits, such as a circuit for a peripheral device, a circuit for a voltage stabilizer and a power management circuit. Bus interfaces are provided, and the transceiver 810 may consist of a plurality of elements, i.e., a transmitter and a receiver for communication with any other devices over a transmission medium. The processor 800 may take charge of managing the bus architecture as well as general processings. The memory 820 may store data desired for the operation of the processor 800.

Figure 9:
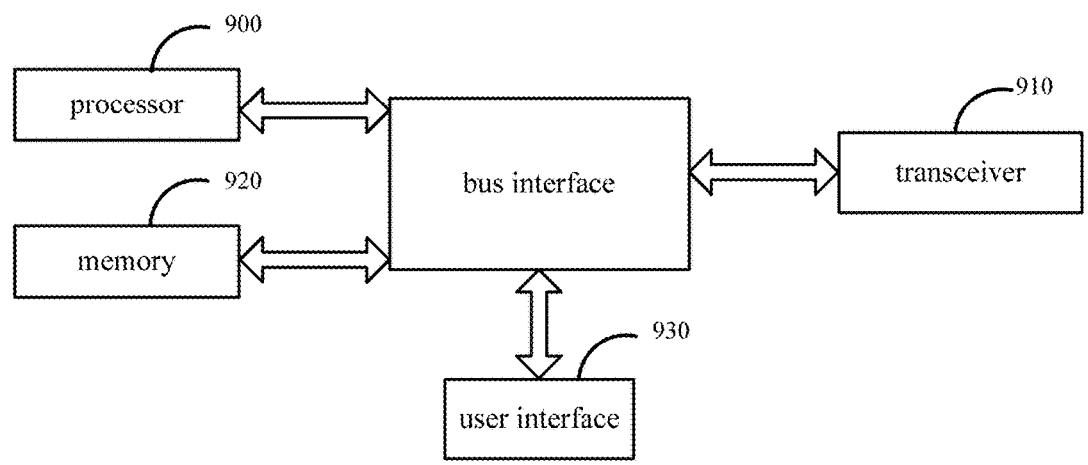
FIG. 9 is a schematic view showing a User Equipment (UE) according to one embodiment of the present disclosure.

As shown in FIG. 9, the present disclosure further provides in some embodiments a terminal, including a processor 900, a transceiver 910 and a memory 920. The processor 900 is configured to read a program stored in the memory 920, so as to: perform channel estimation on a received pilot signal to acquire channel estimation values of A antenna ports for transmitting the pilot signal to a network device; determine Q antenna ports based on the channel estimation values of the A antenna ports, $L \le Q \le A$, L representing a value of a RI adopted by the network device in the case of transmitting downlink data to the terminal or a value of a RI of a channel determined by the terminal; determine a first-level PMI based on the Q antenna ports, and feed back CSI containing the first-level PMI to the network device, the first-level PMI being used to indicate indices of the Q antenna ports among the A antenna ports for transmitting the pilot signal. The transceiver 910 is configured to receive and transmit data under the control of the processor 900.

In a possible embodiment of the present disclosure, the CSI fed by the transceiver 910 to the network device may further include one or more of: a second-level PMI used to indicate an index of a second-level precoding matrix in a second codebook set, a RI and a CQI.

In a possible embodiment of the present disclosure, the CQI may be determined by: determining a first equivalent channel consisting of Q channel estimation values corresponding to the Q antenna ports based on the first-level PMI; determining a second-level precoding matrix based on the second-level PMI and the RI; determining a second equivalent channel based on the first equivalent channel and the second-level precoding matrix; determining an SINR based on the second equivalent channel, power of an interference signal and power of a noise signal; and determining the CQI based on the SINR.

In a possible embodiment of the present disclosure, the processor 900 is further configured to determine, within a range of the number of the antenna ports, all possible combinations of antenna ports, and determine, from all the possible combinations of antenna ports, Q antenna ports capable of providing maximum throughput or capacity of a channel between the terminal and the network device or providing maximum received pilot signal power of the terminal, the throughput or capacity of the channel corresponding to each possible combination of antenna ports or the received pilot signal power of the terminal being determined based on the channel estimation value corresponding to the possible combination of antenna ports.

In a possible embodiment of the present disclosure, the processor 900 is further configured to determine the Q antenna ports through: Step A of determining the range of the number of the antenna ports for measuring the CSI; Step B of setting k=1 and $T_0=0$; Step C of, when k antenna ports are selected from the A antenna ports, determining the throughput or capacity corresponding to each possible combination of antenna ports or the received pilot signal power of the terminal, and selecting one combination of the antenna ports capable of providing the maximum throughput or capacity of the channel or providing the maximum received pilot signal power of the terminal; Step D of, when k<$Q_{max}$, proceeding to Step E, and otherwise proceeding to Step G, $Q_{max}$ representing an upper limit of the range, and L≤$Q_{max}$≤A; Step E of, when $T_k$>$T_{k-1}$, proceeding to Step F, and otherwise proceeding to Step G, $T_k$ representing the throughput or capacitor of the channel or the received pilot signal power corresponding to the combination of antenna ports with the maximum throughput or capacitor of the channel or the maximum received pilot signal power of the terminal when the k antenna ports are selected form the A antenna ports, and $T_{k-1}$ representing the throughput or capacitor of the channel or the received pilot signal power of the terminal corresponding to the combination of antenna ports with the maximum throughput or capacitor of the channel or the maximum received pilot signal power when the k−1 antenna ports are selected from the A antenna ports; Step F of setting k=k+1, and proceeding to Step C; and Step G of determining the antenna ports in the currently-determined combination of antenna ports with the maximum throughput or capacitor of the channel or the maximum received pilot signal power of the terminal as the antenna ports for measuring the CSI.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of a plurality of elements, i.e., a transmitter and a receiver for communication with any other devices over a transmission medium. With respect to different UEs, a user interface 930 may also be provided for devices which are to be arranged inside or outside the UE, and these devices may include but not limited to a keypad, a display, a speaker, a microphone and a joystick. The processor 900 may take charge of managing the bus architecture as well as general processings. The memory 920 may store therein data for the operation of the processor 900.

According to the methods and devices in the embodiments of the present disclosure, the terminal may select at least one antenna port from the A antenna ports for transmitting the pilot signal, so it is able to reduce the overhead during the measurement of the CSI, ensure the CSI measurement accuracy as possible, and simplify the system design. Usually, the number of the antenna ports selected by the terminal is far less than the number of the antennae of the network device, so the overhead may be reduced during the measurement of the CSI. In addition, the terminal may further select a plurality of spatial beam directions and the optimal weight coefficients for them, so it is able to estimate the CSI in a more accurate manner.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Channel State Information (CSI) feedback method, comprising:
   performing, by a terminal, channel estimation based on a pilot signal received by the terminal to acquire channel estimation values of A antenna ports for transmitting the pilot signal to a network device;
   determining, by the terminal, Q antenna ports based on the channel estimation values of the A antenna ports, where $L \leq Q \leq A$, L represents a value of a Rank Indicator (RI) adopted by the network device during transmitting downlink data to the terminal or a value of a RI of a channel determined by the terminal; and determining, by the terminal, a first-level Precoding Matrix Indicator (PMI) based on the Q antenna ports, and feeding back CSI containing the first-level PMI to the network device, the first-level PMI being used to indicate indices of the Q antenna ports among the A antenna ports for transmitting the pilot signal.

2. The CSI feedback method according to claim 1, wherein the CSI fed by the terminal to the network device further comprises one or more of: a second-level PMI used to indicate an index of a second-level precoding matrix in a second-level codebook set; an RI, a Channel Quality Indicator (CQI), and the number Q of the antenna ports selected by the terminal.

3. The CSI feedback method according to claim 1, wherein the CSI fed by the terminal back to the network device further comprises a CQI, which is determined by:
   determining a first equivalent channel consisting of Q channel estimation values corresponding to the Q antenna ports based on the first-level PMI;
   determining a second-level precoding matrix based on the second-level PMI and the RI, wherein the second-level PMI is used to indicate an index of a second-level precoding matrix in a second-level codebook set;
   determining a second equivalent channel based on the first equivalent channel and the second-level precoding matrix;
   determining a Signal-to-Interference plus Noise Ratio (SINR) based on the second equivalent channel, power of an interference signal and power of a noise signal; and
   determining the CQI based on the SINR.

4. The CSI feedback method according to claim 1, wherein the determining, by the terminal, the Q antenna ports based on the channel estimation values of the A antenna ports comprises determining, by the terminal within a range of the number of the antenna ports, all possible combinations of antenna ports, and determining, from all the possible combinations of antenna ports, Q antenna ports capable of providing maximum throughput or capacity of a channel between the terminal and the network device or providing maximum received pilot signal power of the terminal, the throughput or capacity of the channel corresponding to each possible combination of antenna ports or the received pilot signal power of the terminal being determined based on the channel estimation value corresponding to the possible combination of antenna ports.

5. The CSI feedback method according to claim 4, wherein the determining, by the terminal within a range of the number of the antenna ports, all possible combinations of antenna ports and determining, from all the possible combinations of antenna ports, the Q antenna ports capable of providing the maximum throughput or capacity of the channel between the terminal and the network device or providing the maximum received pilot signal power of the terminal comprises:
   Step A of determining the range of the number of the antenna ports for measuring the CSI;
   Step B of setting $k=1$ and $T_0=0$;
   Step C of, when k antenna ports are selected from the A antenna ports, determining the throughput or capacity corresponding to each possible combination of antenna ports or the received pilot signal power of the terminal, and selecting one combination of the antenna ports capable of providing the maximum throughput or capacity of the channel or providing the maximum received pilot signal power of the terminal;
   Step D of, when $k<Q_{max}$, proceeding to Step E, and otherwise proceeding to Step G, $Q_{max}$ representing an upper limit of the range, and $L \leq Q_{max} \leq A$;
   Step E of, when $T_k>T_{k-1}$, proceeding to Step F, and otherwise proceeding to Step G, $T_k$ representing the throughput or capacitor of the channel or the received pilot signal power corresponding to the combination of antenna ports with the maximum throughput or capacitor of the channel or the maximum received pilot signal power of the terminal when the k antenna ports are selected form the A antenna ports, and $T_{k-1}$ representing the throughput or capacitor of the channel or the received pilot signal power of the terminal corresponding to the combination of antenna ports with the maximum throughput or capacitor of the channel or the maximum received pilot signal power when the k–1 antenna ports are selected from the A antenna ports;
   Step F of setting $k=k+1$, and proceeding to Step C; and
   Step G of determining the antenna ports in the currently-determined combination of antenna ports with the maximum throughput or capacitor of the channel or the maximum received pilot signal power of the terminal as the antenna ports for measuring the CSI.

6. A Channel State Information (CSI) acquisition method, comprising:
   receiving, by a network device, CSI from a terminal, the CSI at least including a first-level Precoding Matrix Indicator (PMI) which is used to indicate indices of Q antenna ports among A antenna ports for transmitting a pilot signal, the first-level PMI being determined based on the Q antenna ports after the terminal has determined the Q antenna ports based on channel estimation values of the A antenna ports, $L \leq Q \leq A$, L representing a value of a Rank Indicator (RI) adopted by the network device for transmitting downlink data to the terminal or a value of a RI of a channel determined by the terminal;
   determining, by the network device, a first-level precoding matrix based on the received CSI and beamforming vectors corresponding to the A antenna ports; and
   determining, by the network device, a precoding matrix for transmission based on the first-level precoding matrix.

7. The CSI acquisition method according to claim 6, wherein the CSI received by the network device further comprises one or more of: a second-level PMI used to indicate an index of a second-level precoding matrix in a second codebook set, a RI, a Channel Quality Indicator (CQI), and the number Q of the antenna ports selected by the terminal.

8. The CSI acquisition method according to claim 6, wherein the determining, by the network device, the precoding matrix for transmission based on the first-level precoding matrix comprises determining, by the network device, the precoding matrix for transmission through the following equation: $W=P^{-1/2}W_1 V_L$, where W represents the precoding matrix for transmission, $W_1$ represents the first-level precoding matrix, $V_L$ represents the second-level precoding matrix which is a matrix indicated by the second-level PMI, and $P^{-1/2}$ represents a power normalization factor.

9. The CSI acquisition method according to claim 6, wherein prior to the receiving, by the network device, the CSI from the terminal, the CSI acquisition method further comprises:

determining, by the network device, the A antenna ports for transmitting the pilot signal, a transmission antenna corresponding to each antenna port, a spatial beam corresponding to each antenna port, and a resource for the transmission of the pilot signal, each antenna port corresponding to one spatial beam;

with respect to each antenna port in the A antenna ports, determining, by the network device, a beamforming vector in a first dimension of the spatial beam corresponding to each antenna port and a beamforming vector in a second dimension of the spatial beam corresponding to each antenna port, and determining a three-dimensional (3D) spatial beamforming vector of a beam corresponding to the antenna port based on the beamforming vector in the first dimension and the beamforming vector in the second dimension; and beamforming the pilot signal based on the 3D spatial beamforming vector of the beam corresponding to each antenna port in the A antenna ports and the resource for the transmission of the pilot signal, and transmitting the beamformed pilot signal through all or parts of the transmission antennae.

10. The CSI acquisition method according to claim 9, wherein the determining, by the network device, the spatial beam corresponding to each antenna port comprises determining, by the network device, a direction of a spatial beam corresponding to each antenna port, the number of the beams in each direction and a beam width based on the distribution of the terminals.

11. A network device, comprising a processor, a memory and a transceiver, wherein the processor is configured to read a program stored in the memory, so as to: receive Channel State Information (CSI) from a terminal, the CSI at least comprising a first-level Precoding Matrix Indicator (PMI) which is used to indicate indices of Q antenna ports among A antenna ports for transmitting a pilot signal, the first-level PMI being determined based on the Q antenna ports after the terminal has determined the Q antenna ports based on channel estimation values of the A antenna ports, $L \leq Q \leq A$, L representing a value of a Rank Indicator (RI) adopted by the network device for transmitting downlink data to the terminal or a value of a RI of a channel determined by the terminal; determine a first-level precoding matrix based on the received CSI and beamforming vectors corresponding to the A antenna ports; and determine a precoding matrix for transmission based on the first-level precoding matrix, and the transceiver is configured to receive and transmit data.

12. A terminal, comprising a processor, a memory and a transceiver, wherein the processor is configured to read a program stored in the memory, so as to: perform channel estimation on a received pilot signal to acquire channel estimation values of A antenna ports for transmitting the pilot signal to a network device; determine Q antenna ports based on the channel estimation values of the A antenna ports, $L \leq Q \leq A$, L representing a value of a Rank Indicator (RI) adopted by the network device during transmitting downlink data to the terminal or a value of a RI of a channel determined by the terminal; and determine a first-level Precoding Matrix Indicator (PMI) based on the Q antenna ports, and feed back Channel State Information (CSI) containing the first-level PMI to the network device, the first-level PMI being used to indicate indices of the Q antenna ports among the A antenna ports for transmitting the pilot signal, and the transceiver is configured to receive and transmit data.

13. The terminal according to claim 12, wherein the CSI fed by the transmission unit to the network device further comprises one or more of: a second-level PMI used to indicate an index of a second-level precoding matrix in a second-level codebook set, an RI, a Channel Quality Indicator (CQI), and the number Q of the antenna ports selected by the terminal.

14. The terminal according to claim 12, wherein the CSI fed by the transmission unit back to the network device further comprises a CQI, which is determined by:

determining a first equivalent channel consisting of Q channel estimation values corresponding to the Q antenna ports based on the first-level PMI;

determining a second-level precoding matrix based on the second-level PMI and the RI, wherein the second-level PMI is used to indicate an index of a second-level precoding matrix in a second-level codebook set;

determining a second equivalent channel based on the first equivalent channel and the second-level precoding matrix;

determining a Signal-to-Interference plus Noise Ratio (SINR) based on the second equivalent channel, power of an interference signal and power of a noise signal; and determining the CQI based on the SINR.

15. The terminal according to claim 12, wherein the processor is further configured to determine, within a range of the number of the antenna ports, all possible combinations of antenna ports, and determine, from all the possible combinations of antenna ports, Q antenna ports capable of providing maximum throughput or capacity of a channel between the terminal and the network device or providing maximum received pilot signal power of the terminal, the throughput or capacity of the channel corresponding to each possible combination of antenna ports or the received pilot signal power of the terminal being determined based on the channel estimation value corresponding to the possible combination of antenna ports.

16. The terminal according to claim 15, wherein the processor is further configured to determine the Q antenna ports through:

Step A of determining the range of the number of the antenna ports for measuring the CSI;

Step B of setting $k=1$ and $T_0=0$;

Step C of, when k antenna ports are selected from the A antenna ports, determining the throughput or capacity corresponding to each possible combination of antenna ports or the received pilot signal power of the terminal, and selecting one combination of the antenna ports capable of providing the maximum throughput or capacity of the channel or providing the maximum received pilot signal power of the terminal;

Step D of, when $k \leq Q_{max}$, proceeding to Step E, and otherwise proceeding to Step G, $Q_{max}$ representing an upper limit of the range, and $L \leq Q_{max} \leq A$;

Step E of, when $T_k > T_{k-1}$, proceeding to Step F, and otherwise proceeding to Step G, $T_k$ representing the throughput or capacitor of the channel or the received pilot signal power corresponding to the combination of antenna ports with the maximum throughput or capacitor of the channel or the maximum received pilot signal power of the terminal when the k antenna ports are selected form the A antenna ports, and $T_{k-1}$ representing the throughput or capacitor of the channel or the received pilot signal power of the terminal corresponding to the combination of antenna ports with the maximum throughput or capacitor of the channel or the maximum received pilot signal power when the k−1 antenna ports are selected from the A antenna ports;

Step F of setting k=k+1, and proceeding to Step C; and

Step G of determining the antenna ports in the currently-determined combination of antenna ports with the maximum throughput or capacitor of the channel or the maximum received pilot signal power of the terminal as the antenna ports for measuring the CSI.

17. The network device according to claim 11, wherein the CSI received by the reception unit further comprises one or more of: a second-level PMI used to indicate an index of a second-level precoding matrix in a second codebook set, a RI, a Channel Quality Indicator (CQI), and the number Q of the antenna ports selected by the terminal.

18. The network device according to claim 11, wherein the processor is further configured to determine the precoding matrix for transmission through the following equation: $W=P^{-1/2}W_1V_L$, where W represents the precoding matrix for transmission, $W_1$ represents the first-level precoding matrix, $V_L$ represents the second-level precoding matrix which is a matrix indicated by the second-level PMI, and $P^{-1/2}$ represents a power normalization factor.

19. The network device according to claim 11, wherein prior to the reception of the CSI from the terminal, the processor is further configured to:

determine the A antenna ports for transmitting the pilot signal, a transmission antenna corresponding to each antenna port, a spatial beam corresponding to each antenna port, and a resource for the transmission of the pilot signal, each antenna port corresponding to one spatial beam;

with respect to each antenna port in the A antenna ports, determine a beamforming vector in a first dimension of the spatial beam corresponding to each antenna port and a beamforming vector in a second dimension of the spatial beam corresponding to each antenna port, and determine a three-dimensional (3D) spatial beamforming vector of a beam corresponding to the antenna port based on the beamforming vector in the first dimension and the beamforming vector in the second dimension; and beamform the pilot signal based on the 3D spatial beamforming vector of the beam corresponding to each antenna port in the A antenna ports and the resource for the transmission of the pilot signal, and transmit the beamformed pilot signal through all or parts of the transmission antennae.

20. The network device according to claim 19, wherein the processor is further configured to determine a direction of a spatial beam corresponding to each antenna port, the number of the beams in each direction and a beam width based on the distribution of the terminals.

* * * * *